UNITED STATES PATENT OFFICE.

WILLIAM ARROUQUIER AND THOMAS BARRETT, OF WORCESTER, MASS.

MORTAR AND PLASTER.

SPECIFICATION forming part of Letters Patent No. 262,343, dated August 8, 1882.

Application filed March 24, 1882. (No specimens.)

*To all whom it may concern:*

Be it known that we, WILLIAM ARROUQUIER and THOMAS BARRETT, both of the city and county of Worcester, and Commonwealth of Massachusetts, have invented certain new and useful Improvements in Mortar and Plaster; and we do hereby declare that the following is a full, clear, and exact description of the same.

To enable those skilled in the art to which our invention belongs to make and use the same, we will proceed to describe the invention more in detail.

Our improved mortar and plaster is made from soapstone, lime putty, alum, mineral coal, and saccharine acid, as follows: The soapstone is powdered fine, and the lime putty is made from burned lime with water mixed therewith to give it the consistency of soft putty. The alum, mineral coal, and saccharine acid are pulverized or powdered fine, and all of said ingredients are mixed together, to be used for mortar or plaster, in the following proportions: First, to every two hundred and fifty pounds of powdered soapstone about eighty pounds, or one-third quantity, of lime putty, seven pounds of alum, twenty-five pounds of mineral coal, and one pound of saccharine acid are mixed; and, second, such substances are stirred and mixed together in a suitable receptacle, sufficient water being added during the operation to bring the whole to the consistency of common mortar.

The great advantages of our present invention over that which was patented to us November 29, 1881, for mortar for laying brick, &c., are that the mortar or plaster by using saccharine acid as one of the ingredients sets slower in the mixing-receptacle and gives more time to use it before becoming stiff and hard, thus requiring less working than is the case in ordinary mortar, and also the case in our former invention; and, further, by using mineral coal and saccharine acid with the other ingredients, after our mortar or plaster has been applied it becomes very hard—very much harder and more adhesive than any mortar or plaster that has been made prior to our present invention.

By using saccharine acid with the other ingredients, as described, we are enabled to fix the color which may be used to give the mortar or plaster any shade desired in a more satisfactory and lasting manner than has been possible before our invention, in our mortar or plaster the color remaining bright and not fading.

We hereby disclaim the invention described in the Letters Patent granted to C. Clinton, October 28, 1835. We also disclaim the invention described in the Letters Patent granted to G. E. Vanderburgh, July 11, 1865, No. 48,747.

Having described our improvements in mortar and plaster, what we claim therein as new and of our invention, and desire to secure by Letters Patent, is—

A mortar or plaster composed of powdered soapstone, lime putty, alum, mineral coal, and saccharine acid, in the proportions substantially as above described.

WILLIAM ARROUQUIER.
THOMAS BARRETT.

Witnesses:
THOS. H. DODGE,
JOHN C. DEWEY.